United States Patent
Wang et al.

(10) Patent No.: US 12,177,002 B2
(45) Date of Patent: Dec. 24, 2024

(54) WAVELENGTH DIVISION MULTIPLEXING STRUCTURE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Dong Wang, Beijing (CN); Dechao Zhang, Beijing (CN); Yunbo Li, Beijing (CN); Jiang Sun, Beijing (CN); Qian Cai, Beijing (CN); Yang Zhao, Beijing (CN); Han Li, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 101 days.

(21) Appl. No.: 18/002,266

(22) PCT Filed: Jun. 28, 2021

(86) PCT No.: PCT/CN2021/102855
§ 371 (c)(1),
(2) Date: Dec. 17, 2022

(87) PCT Pub. No.: WO2022/001989
PCT Pub. Date: Jan. 6, 2022

(65) Prior Publication Data
US 2023/0344545 A1    Oct. 26, 2023

(30) Foreign Application Priority Data
Jun. 30, 2020 (CN) .......................... 202010619054.1

(51) Int. Cl.
*H04J 14/02* (2006.01)
*G02B 6/293* (2006.01)

(52) U.S. Cl.
CPC .......... *H04J 14/03* (2023.08); *H04J 14/0221* (2013.01); *G02B 6/2938* (2013.01)

(58) Field of Classification Search
CPC ............................ H04J 14/03; H04J 14/0307
See application file for complete search history.

(56) References Cited

U.S. PATENT DOCUMENTS

| 5,608,825 A | * | 3/1997 | Ip | H04J 14/0213 385/27 |
| 5,909,295 A | * | 6/1999 | Li | G02B 6/29362 398/87 |

(Continued)

FOREIGN PATENT DOCUMENTS

| CN | 1412969 A | 4/2003 |
| CN | 1433181 A | 7/2003 |

(Continued)

OTHER PUBLICATIONS

International Search Report in the international application No. PCT/CN2021/102855, mailed on Sep. 10, 2021.

(Continued)

*Primary Examiner* — Nathan M Cors
(74) *Attorney, Agent, or Firm* — Syncoda LLC; Feng Ma

(57) ABSTRACT

A wavelength division multiplexing structure comprises a first wavelength division multiplexer and a second wavelength division multiplexer, each comprises N filtering units, a branch side interface connected to each filtering unit, and a line side interface, N being a positive integer; each filtering unit corresponds to one central wavelength; the line side interface of the first wavelength division multiplexer and that of the second wavelength division multiplexer are connected by an optical fiber; the N filtering units are (Continued)

divided into multiple filtering unit groups, and the multiple filtering unit groups are cascaded in series or cascaded in a series-parallel combination; filter units in each filtering unit group are cascaded in series; and a cascade mode and/or cascade position corresponding to each filter unit in the first wavelength division multiplexer and the second wavelength division multiplexer is at least related to the center wavelengths corresponding to the filter unit.

9 Claims, 5 Drawing Sheets

(56) References Cited

U.S. PATENT DOCUMENTS

| | | | |
|---|---|---|---|
| 5,943,149 A * | 8/1999 | Cearns | H04J 14/02 398/79 |
| 6,404,521 B1 | 6/2002 | Yang | |
| 6,708,002 B1 | 3/2004 | Novak | |
| 7,209,609 B2 | 4/2007 | Shin | |
| 7,340,175 B2 | 3/2008 | Wang | |
| 9,780,903 B2 | 10/2017 | Okayama | |
| 2002/0181046 A1 * | 12/2002 | Jeong | G02B 6/29362 398/79 |
| 2003/0185565 A1 | 10/2003 | Wang | |
| 2004/0052529 A1 | 3/2004 | Lauder | |
| 2004/0228602 A1 * | 11/2004 | Livas | H04B 10/077 385/24 |
| 2005/0002672 A1 * | 1/2005 | Sakai | H04J 14/0221 398/79 |
| 2005/0041974 A1 | 2/2005 | Novak et al. | |
| 2006/0008202 A1 | 1/2006 | Shin | |
| 2008/0212966 A1 * | 9/2008 | Costantini | H04B 10/296 398/79 |
| 2015/0295672 A1 | 10/2015 | Okayama | |

FOREIGN PATENT DOCUMENTS

| | | |
|---|---|---|
| JP | 2003283427 A | 10/2003 |
| KR | 20200034628 A | 3/2020 |
| WO | 03069820 A1 | 8/2003 |

OTHER PUBLICATIONS

Written Opinion of the International Search Authority in the international application No. PCT/CN2021/102855, mailed on Sep. 10, 2021.

Li, Yao et al., "Performance of an ultra-low loss, ultra compact, free-space packaging platform for CWDM applications", Published in: Digest of the LEOS Summer Topical Meetings Biophotonics/Optical Interconnects and VLSI Photonics/WBM Microcavities, 2004, Date of Conference: Jun. 28-30, 2004, pp. 73-74, WB1.4, 2 pages.

Supplementary European Search Report in the European application No. 21834360.6, mailed on Jun. 28, 2024. 9 pages.

* cited by examiner

WAVELENGTH DIVISION MULTIPLEXING STRUCTURE

CROSS-REFERENCE TO RELATED APPLICATIONS

This is a national phase application of International Application No. PCT/CN2021/102855 filed on Jun. 28, 2021, which claims priority to Chinese Patent Application No. 202010619054.1 filed on Jun. 30, 2020. The disclosures of the above-referenced applications are hereby incorporated by reference in their entirety.

TECHNICAL FIELD

The present disclosure relates to the technical field of fiber optical communications, and in particular to a Wavelength Division Multiplexing (WDM) structure.

BACKGROUND

A 5G feedforward network may use a WDM scheme to greatly save fiber resources. WDM may be realized by means of a Thin Film Filter (TFF) and an Arrayed Waveguide Grating (AWG). The TFF scheme has a low cost, and an insertion loss increases step by step with the increase of the number of channels, making it suitable for a WDM scenario with a low number of channels. The AWG scheme has a high cost, and the insertion loss of each channel is uniform, making it suitable for a WDM scenario with dense channels. For a 12-channel scenario, the TFF scheme is generally adopted.

A channel power budget needs to consider transmission loss, joint loss, maintenance redundancy requirement, dispersion penalty, insertion loss of a wavelength division multiplexer, etc. At present, the design principle of the wavelength division multiplexer in the TFF scheme is the principle of uniform pairwise insertion losses of each channel, that is, for each channel with a certain wavelength, the sum of the insertion loss of the wavelength division multiplexer at one end and the insertion loss of the wavelength division multiplexer at the other end is relatively uniform. In this manner, only the optimal insertion loss of the wavelength division multiplexer is considered, and different link budgets caused by transmission performance differences of different wavelengths in the application scenarios are ignored. Therefore, the power budgets of some channels exceed the industrial capability of a low-cost Directly Modulated Laser (DML)+PIN chip scheme, and then these channels require use of a high-cost Avalanche Photon Diode (APD) chip scheme. If two chip schemes are adopted, it is not conducive to the production process and maintenance management. If only one chip scheme is adopted, all channels need to use the high-cost APD chip scheme, which will greatly increase the cost.

SUMMARY

Embodiments of the present disclosure provide a WDM structure.

Technical solutions of the embodiments of the present disclosure are implemented as follows.

The embodiments of the present disclosure provide a WDM structure, which may include a first wavelength division multiplexer and a second wavelength division multiplexer. Each of the first wavelength division multiplexer and the second wavelength division multiplexer includes N filtering units, a branch side interface connected to each of the filtering units, and a line side interface. N is a positive integer. Each of the filtering units corresponds to one central wavelength. The line side interface of the first wavelength division multiplexer and the line side interface of the second wavelength division multiplexer are connected by an optical fiber.

The N filtering units are divided into multiple filtering unit groups, and the multiple filtering unit groups are cascaded in series, or the multiple filtering unit groups are cascaded in a series-parallel combination. The filtering units in each filtering unit group are cascaded in series.

A cascade mode and/or cascade position corresponding to each of the filtering units in the first wavelength division multiplexer and the second wavelength division multiplexer is at least related to a central wavelengths corresponding to the filtering unit, so that a total power budget of a channel corresponding to each central wavelength is less than or equal to a first power threshold, and a difference between total power budgets of respective channels corresponding to different central wavelengths is less than a second power threshold.

In some optional embodiments of the present disclosure, the N filtering units are divided into multiple filtering unit groups based on the central wavelength corresponding to each of the filtering units.

In some optional embodiments of the present disclosure, each filtering unit group in the first wavelength division multiplexer and the second wavelength division multiplexer corresponds to one group of central wavelengths, and wavelength ranges formed by different groups of central wavelengths do not overlap.

In some optional embodiments of the present disclosure, the cascade positions of the first filtering unit group in the first wavelength division multiplexer and the second wavelength division multiplexer are the same. The first filtering unit group is any of the multiple filtering unit groups.

In some optional embodiments of the present disclosure, filtering units in the first filtering unit group in the first wavelength division multiplexer are connected in series in a first order, and filtering units in the first filtering unit group in the second wavelength division multiplexer are connected in series in a second order. The second order is a reverse order of the first order.

In some optional embodiments of the present disclosure, pairwise channel insertion losses corresponding to different groups of central wavelengths in the first wavelength division multiplexer and the second wavelength division multiplexer are in non-uniform distribution.

Pairwise channel insertion losses corresponding to the same group of central wavelengths in the first wavelength division multiplexer and the second wavelength division multiplexer are in relatively uniform distribution.

In some optional embodiments of the present disclosure, in a case where the multiple filtering unit groups are connected in series, when a specified central wavelength corresponding to a filtering unit group in the first wave division multiplexer and the second wave division multiplexer is larger, a cascade position of the filtering unit group is closer to the line side interface.

In some optional embodiments of the present disclosure, if a filtering unit in the second filtering unit group of the multiple filtering unit groups corresponds to the maximum central wavelength of N central wavelengths, a filtering unit corresponding to the maximum central wavelength in the second filtering unit group in the first wavelength division multiplexer is connected with the line side interface of the first wavelength division multiplexer; and a filtering unit, which corresponds to the minimum central wavelength in the wavelength range corresponding to the second filtering unit group, in the second filtering unit group in the second wavelength division multiplexer is connected with the line side interface of the second wavelength division multiplexer.

In some optional embodiments of the present disclosure, when the multiple filtering unit groups are cascaded in the series-parallel combination, the first wavelength division multiplexer and the second wavelength division multiplexer also each includes an optical splitter unit. The first interface of the optical splitter unit is connected with at least one filtering unit group, and filtering units in the at least one filtering unit group are connected in series.

The second interface and the third interface of the optical splitter unit are respectively connected with two filtering unit groups connected in parallel.

In some optional embodiments of the present disclosure, a cascade position corresponding to each filtering unit in the first wavelength division multiplexer and the second wavelength division multiplexer is related to a central wavelength corresponding to the filtering unit and a power loss of the optical splitter unit.

In some optional embodiments of the present disclosure, the total power budget includes a wavelength division multiplexer pairwise channel insertion loss, a dispersion penalty, a transmission loss, a joint loss and maintenance redundancy. The wavelength division multiplexer pairwise channel insertion loss is related to a cascade position of each filtering unit in the first wavelength division multiplexer and the second wavelength division multiplexer, the dispersion penalty and the transmission loss are related to a central wavelength.

The WDM structure provided by the embodiments of the present disclosure includes a first wavelength division multiplexer and a second wavelength division multiplexer. The first wavelength division multiplexer and the second wavelength division multiplexer each includes N filtering units, a branch side interface connected to each of the filtering units, and a line side interface, N being a positive integer. Each filtering unit corresponds to one central wavelength. The line side interface of the first wavelength division multiplexer and the line side interface of the second wavelength division multiplexer are connected by an optical fiber. The N filtering units are divided into multiple filtering unit groups, and the multiple filtering unit groups are cascaded in series, or the multiple filtering unit groups are cascaded in a series-parallel combination. The filtering units in each filtering unit group are cascaded in series. At least one of a cascade mode or a cascade position corresponding to each filtering unit in the first wavelength division multiplexer and the second wavelength division multiplexer is at least related to the central wavelength corresponding to the filtering unit, so that the total power budget of the channel corresponding to each central wavelength is less than or equal to a first power threshold, and the difference between the total power budgets of the channels corresponding to different central wavelengths is less than a second power threshold. With the technical solutions of the embodiments of the present disclosure, the total power budget of the channel corresponding to each central wavelength is taken into account to determine the cascade mode and/or cascade position corresponding to each filtering unit in the first wavelength division multiplexer and the second wavelength division multiplexer, the total power budgets of the channels are uniform, thereby enabling the total power budgets of the channels to meet the requirement of one type of chip and avoiding the inconvenience of production process and maintenance management caused by using two types of chip; further, the total power budgets of the channels for the 12-wavelength medium wavelength division multiplexer (MWDM) meet the requirement of the low-cost DML+PIN chip, thereby greatly reducing the cost.

DETAILED DESCRIPTION

The present disclosure is further elaborated below in combination with the accompanying drawings and specific embodiments.

The 5G feedforward network is based on an architecture of Active Antenna Unit (AAU) and Distribute Unit (DU)+ Centralized Unit (CU). The DU in a C-RAN scenario will connect multiple (for example, 6-15) physical stations. In this scenario, each physical station requires 12 optical fibers, resulting in large optical fiber consumption for the feedforward network. In order to solve the problem of heavy use of optical fibers, a WDM device may be used in the feedforward network to save feedforward optical fiber resources. The C-RAN is a clean system based on centralized processing, collaborative radio, and real time cloud architecture infrastructure.

Figure 1:
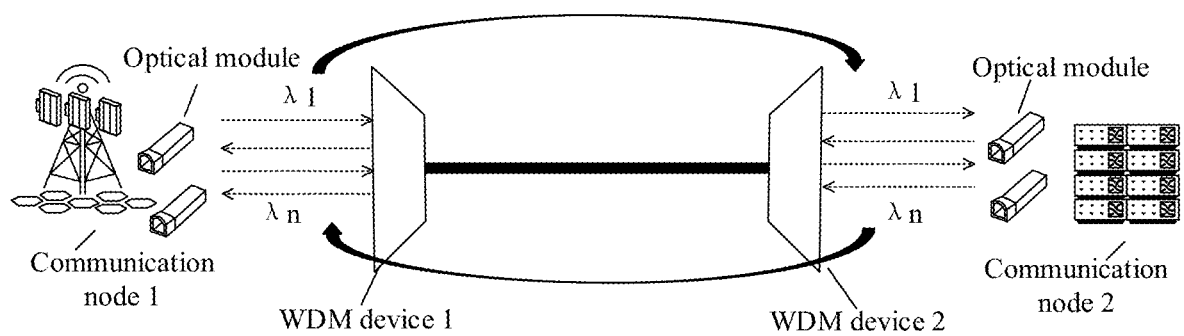
FIG. 1 is a schematic architecture diagram of a WDM system.

FIG. 1 is a schematic architecture diagram of a WDM system. As shown in FIG. 1, the WDM system may include two WDM devices, denoted as WDM device 1 and WDM device 2. The WDM device 1 and the WDM device 2 may be set in a feedforward network connecting communication node 1 and communication node 2. Exemplarily, the communication node 1 may be an AAU, and the communication node 2 may be a DU. Optionally, the WDM device 1 is close to the communication node 1, and the WDM device 2 is close to the communication node 2.

The WDM system also includes multiple optical modules. In an implementation mode, the multiple optical modules may be set respectively at the communication node 1 and the communication node 2. The communication node 1 and the communication node 2 are respectively provided with interfaces corresponding to the optical modules, so that an optical module may perform transmission of optical signals with the adjacent WDM device after being inserted into the interfaces, to realize communication. In another implementation mode, an optical module may also be arranged on the WDM device, and the WDM device is provided with the interface corresponding to the optical module, so that the WDM device may perform transmission of optical signals with the optical module after the optical module is inserted into the interface. It is to be understood that the WDM device mentioned above is the wavelength division multiplexer in the embodiments.

Figure 2:
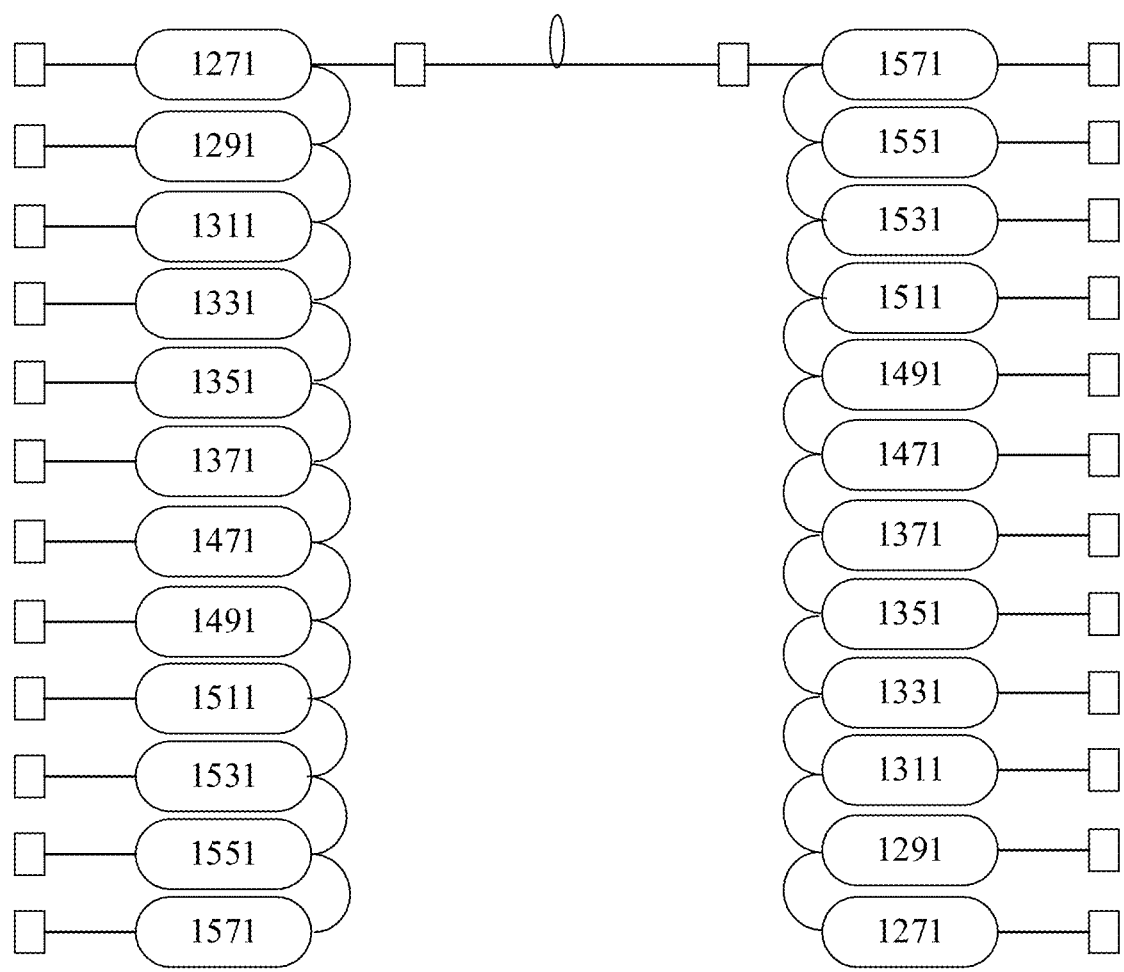
FIG. 2 is a deployment structure diagram of a Coarse Wavelength Division Multiplexing (CWDM) system in the related technical solution.

Taking that the WDM device is a coarse wavelength division multiplexer (CWDM) for example, the existing requirement on the insertion loss of the coarse wavelength division multiplexer is that the insertion losses of different channels are the same and the uniformity is less than 1 dB. Therefore, in the actual production design, the coarse wavelength division multiplexers based on TFF cascade are arranged in a reverse order. As shown in FIG. 2, the cascade order for the wavelength division multiplexer on one end is in an ascending order of wavelengths, and the cascade order for the wavelength division multiplexer on the other end is in a descending order of wavelengths. According to the design method shown in FIG. 2, each pairwise channel insertion loss of the wavelength division multiplexer is about 5 dB. The pairwise channel insertion loss means that, taking the wavelength of 1271 nanometers (nm) in FIG. 2 as an example, the sum of channel insertion losses corresponding to the wavelength of 1271 nm in the wavelength division multiplexers on two ends is the pairwise channel insertion loss corresponding to the wavelength of 1271 nm.

Because the TFF scheme adopts the cascade connection, the insertion loss on one side is related to a cascade position (or a cascade number). Taking the wavelength division multiplexer on the left shown in FIG. 2 as an example, it may be regarded that the optical signal with the wavelength of 1271 nm is transmitted through a filtering unit with the central wavelength of 1271 nm and then directly transmitted to the wavelength division multiplexer on the opposite end through a line interface; and the optical signal with the wavelength of 1571 nm is transmitted through a filtering unit with the central wavelength of 1571 nm and then reflected through the filtering units with the central wavelengths of 1551 nm, 1531 nm, 1511 nm, 1491 nm, 1471 nm, 1371 nm, 1351 nm, 1331 nm, 1311 nm, 1291 nm and 1271 nm in sequence, which is equivalent to that the optical signal can only be transmitted to the wavelength division multiplexer on the opposite end after being reflected by the above 11 filtering units. Thus, the larger the cascade number is, the larger the corresponding insertion loss of the filtering unit is. Based on this, using the design method in which the wavelength division multiplexers on two ends are arranged in a reverse order as shown in FIG. 2 makes the pairwise channel insertion loss corresponding to each wavelength uniform, which is about 5 dB.

The channel power budget needs to consider transmission (fiber splicing) loss, movable joint loss, maintenance redundancy, transmission and dispersion penalty, as well as optical multiplexer/demultiplexer insertion loss, etc. For the typical 10 kilometers (km) channel loss, the transmission line loss of an MWDM system in O band is calculated as 0.35 dB/km, the movable joint loss is calculated as 0.5 dB per joint, there are a total of 4 joints in 10 km, and the maintenance redundancy is 2 dB, then indicators of power budget for 12-wavelength channels of the MWDM may be shown in Table 1. In Table 1, the first column of data represents the central wavelength, the second column of data represents the pairwise channel insertion loss, the third column of data represents the dispersion penalty, the fourth column of data represents the 10 km transmission loss, the fifth column of data represents the joint loss, and the sixth column of data represents the maintenance redundancy.

TABLE 1

| Central wavelength | Pairwise channel insertion loss | Dispersion penalty | Transmission loss | Joint loss | Maintenance redundancy |
|---|---|---|---|---|---|
| 1374.5 | 5 | 4.5 | 3.5 | 2 | 2 |
| 1367.5 | 5 | 4.5 | 3.5 | 2 | 2 |
| 1354.5 | 5 | 4.5 | 3.5 | 2 | 2 |
| 1347.5 | 5 | 4.5 | 3.5 | 2 | 2 |
| 1334.5 | 5 | 3 | 3.5 | 2 | 2 |
| 1327.5 | 5 | 3 | 3.5 | 2 | 2 |
| 1314.5 | 5 | 1 | 3.5 | 2 | 2 |
| 1307.5 | 5 | 1 | 3.5 | 2 | 2 |
| 1294.5 | 5 | 1 | 3.5 | 2 | 2 |
| 1287.5 | 5 | 1 | 3.5 | 2 | 2 |
| 1274.5 | 5 | 1 | 3.5 | 2 | 2 |
| 1267.5 | 5 | 1 | 3.5 | 2 | 2 |

It can be calculated from Table 1 that, for four wavelengths of 1347.5 nm-1374.5 nm, the total power budget is greater than 17 dB, while the low-cost DML+PIN chip scheme is usually about 15 dB to ensure the chip yield for scale application. In order to meet the mass production application with the power budget of 17 dB, a high-cost APD chip is needed. If two types of optical module chips are used, it is not conducive to the production process and maintenance management; if one type of optical module chips are used, it needs to be unified to the maximum power budget of 17 dB, and all the 12 wavelengths need to use the APD chips, which greatly increases the cost.

It can be clearly found by converting the data in Table 1 into a more intuitive bar graph that although the pairwise channel insertion losses of the channels are uniformly distributed after the wavelength division multiplexers are arranged in a reverse order as shown in FIG. 2, the total power budgets of the channels differ greatly, mainly because the dispersion penalties of the channels differ greatly, and the transmission losses are also different in a case of a wide range of the central wavelengths. Such design of the wavelength division multiplexers with uniform pairwise insertion loss cannot match the total power budget requirement well.

Based on this, in the embodiments of the present disclosure, a design method of wavelength division multiplexers with non-uniformly distributed pairwise channel insertion losses is used, and the TFF cascade with flexible arrangement replaces the reverse arrangement in the related technical solution, so that the total power budget of each channel is uniform. Taking the total power budget into account, the parameters such as the pairwise channel insertion loss of the wavelength division multiplexer, the dispersion penalty and the transmission loss are comprehensively considered for the overall design. The embodiments only need to optimize the TFF arrangement design, and has the advantages of low cost, flexibility and rapid employ in commercial application. Taking the uniform total power budget of each channel as the overall goal, the total power budget of each channel of the MWDM with 12 wavelengths is relatively uniform, the total power budget of 12 channels of 15 dB is achieved, and the low-cost DML+PIN chips are adopted for all the 12 wavelengths, thereby solving the above problems of high cost, production process and maintenance management.

The embodiments of the present disclosure provide a WDM structure. The WDM structure may include a first wavelength division multiplexer and a second wavelength division multiplexer. Each of the first wavelength division multiplexer and the second wavelength division multiplexer includes N filtering units, a branch side interface connected to each of the filtering units, and a line side interface. N is a positive integer. Each filtering unit corresponds to one central wavelength. The line side interface of the first wavelength division multiplexer and the line side interface of the second wavelength division multiplexer are connected by an optical fiber. The N filtering units are divided into multiple filtering unit groups, and the multiple filtering unit groups are cascaded in series, or the multiple filtering unit groups are cascaded in a series-parallel combination. The filtering units in each filtering unit group are cascaded in series. A cascade mode and/or cascade position corresponding to each of the filtering units in the first wavelength division multiplexer and the second wavelength division multiplexer are at least related to the central wavelength corresponding to the filtering unit, so that a total power budget of a channel corresponding to each central wavelength is less than or equal to a first power threshold, and a difference between total power budgets of respective channels corresponding to different central wavelengths is less than a second power threshold.

Figure 3:
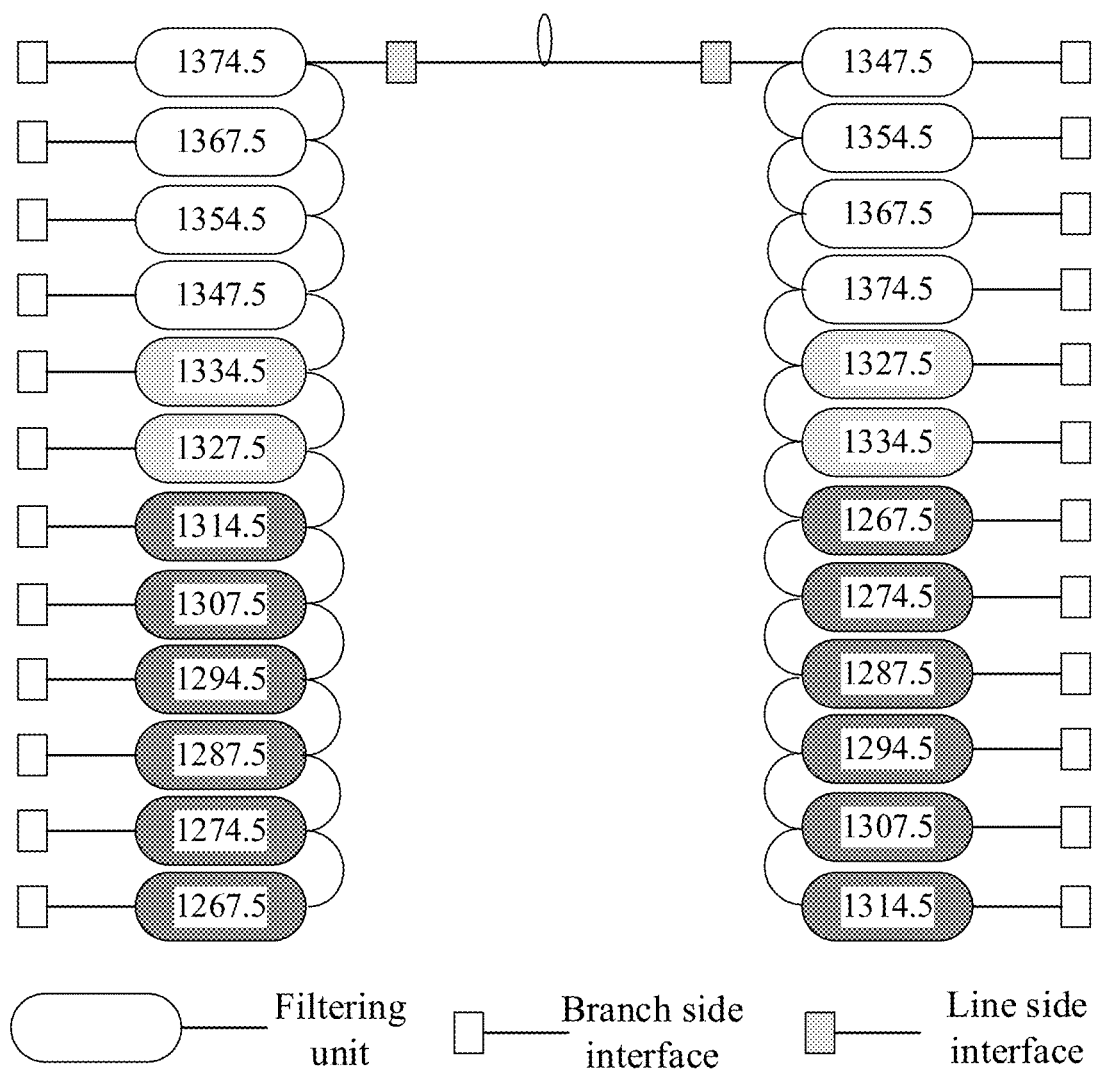
FIG. 3 is a schematic diagram of a WDM structure in an embodiment of the present disclosure.
Figure 5:
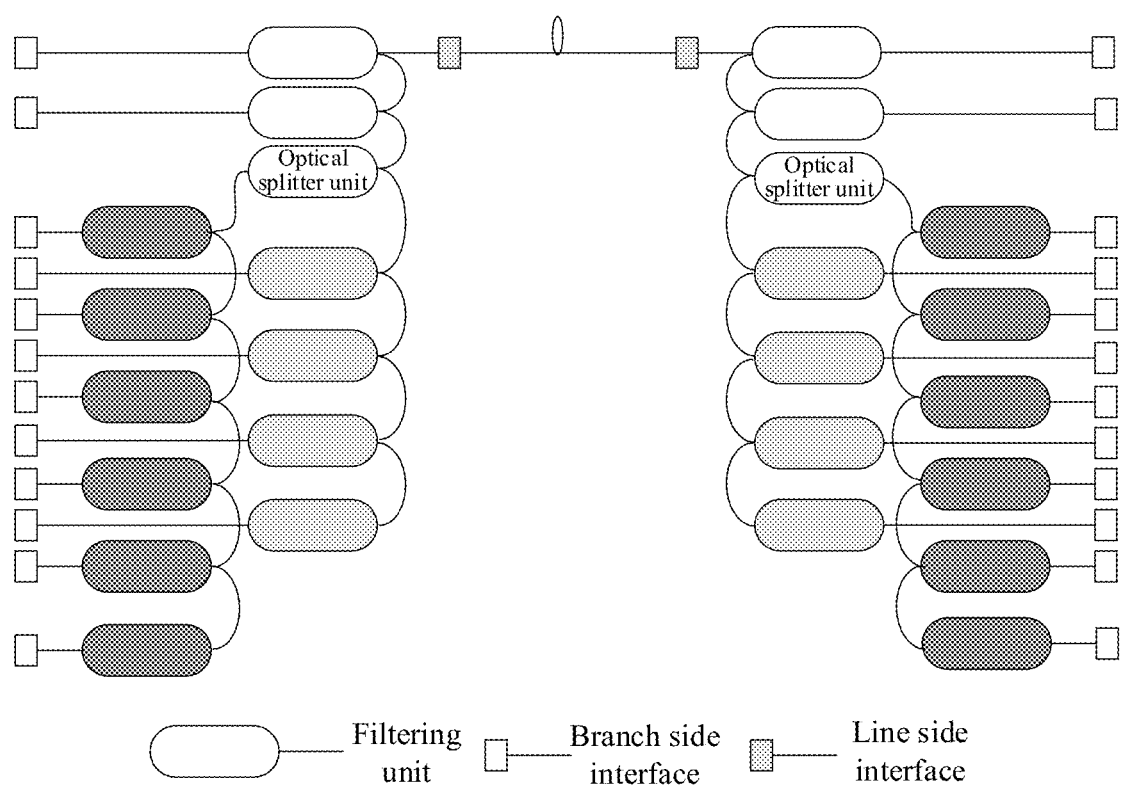
FIG. 5 is another schematic diagram of a WDM structure in an embodiment of the present disclosure.

In the embodiments, the WDM structure includes a first wavelength division multiplexer and a second wavelength division multiplexer. As shown in FIG. 3 or FIG. 5, both the first wavelength division multiplexer and the second wavelength division multiplexer include the same number (N) of filtering units, and each filtering unit is connected to one branch side interface, and in combination with FIG. 1, the wavelength division multiplexer may perform transmission of optical signals with each optical module through a respective branch side interface. The first wavelength division multiplexer and the second wavelength division multiplexer each has a line side interface, and the optical signals are transmitted between the first wavelength division multiplexer and the second wavelength division multiplexer through their respective line side interfaces. It is to be understood that taking the first wavelength division multiplexer consisting of the filtering units, the branch side interfaces and the line side interface on the left of FIG. 3 or FIG. 5 and the second wavelength division multiplexer consisting of the filtering units, the branch side interfaces and the line side interface on the right of FIG. 3 or FIG. 5 for example, in the first wavelength division multiplexer or the second wavelength division multiplexer, an optical signal with each central wavelength is transmitted to the wavelength division multiplexer on the opposite end through the corresponding line side interface.

In the embodiments, taking the 12 wavelengths and 10 km channel loss of the MWDM as an example, based on the power budget shown in Table 1, the 10 km transmission loss, joint loss and maintenance redundancy are the same for each wavelength, while the dispersion penalty is different. It can be seen from Table 1 that the dispersion penalty is related to the wavelength (or wavelength range). The dispersion penalty in a specific wavelength range is approximately the same, and the dispersion penalty is significantly different in different specific wavelength ranges. In other WDM systems, especially the systems with a wide range of central wavelengths, the 10 km transmission loss may also be different according to different central wavelengths.

Based on this, in the embodiments, taking the total power budget of the channel corresponding to each central wavelength into account, the total power budget corresponding to each channel (i.e., each central wavelength) is less than or equal to the first power threshold, and the difference between the total power budgets corresponding to different channels (i.e., different central wavelengths) is less than the second power threshold, so as to achieve the uniform total power budget of each channel (i.e., each central wavelength).

In the embodiments, taking the total power budget of each channel into account, the total power budget of each channel is uniformly distributed (that is, the total power budget corresponding to each channel is less than or equal to the first power threshold), while the dispersion penalties corresponding to the channels are different due to the different central wavelengths; and further, it can be derived based on Table 1 that the dispersion penalties in the wavelength range corresponding to a group of central wavelengths are approximately the same, and the dispersion penalties in the wavelength range corresponding to different groups of central wavelengths are different, so that the pairwise channel insertion losses corresponding to the different groups of central wavelengths in the first wavelength division multiplexer and the second wavelength division multiplexer are in non-uniform distribution, and the pairwise channel insertion losses corresponding to the same group of central wavelengths are in relatively uniform distribution.

In some optional embodiments, the total power budget includes a wavelength division multiplexer pairwise channel insertion loss, a dispersion penalty, a transmission loss, a joint loss and maintenance redundancy. The wavelength division multiplexer pairwise channel insertion loss is related to a cascade position of each filtering unit in the first wavelength division multiplexer and the second wavelength division multiplexer, the dispersion penalty and the transmission loss are related to a central wavelength.

In the embodiments, the first power threshold may be a threshold determined based on the above calculation method of the total power budget. In some examples, if the first power threshold is equal to the corresponding value of a good yield of the low-cost DML+PIN chip for scale application, for example, 15 dB, the WDM structure in the embodiments may be applicable to the low-cost DML+PIN chip. The second power threshold may be pre-configured based on actual demand.

In some optional embodiments, N filtering units are grouped based on the central wavelengths corresponding to the filtering units, that is, N filtering units may be divided into multiple groups according to N central wavelengths. It is exemplary that, the N central wavelengths may be sorted in an ascending order (from a low wavelength to a high wavelength) or in a descending order (from the high wavelength to the low wavelength), and the N central wavelengths are divided into multiple groups based on the above sorting.

Optionally, each filtering unit group in the first wavelength division multiplexer and the second wavelength division multiplexer corresponds to one group of central wavelengths, and the wavelength ranges formed by the groups of central wavelengths do not overlap. Exemplarily, taking N being 12 as an example, the order of central wavelength 1, central wavelength 2, . . . and central wavelength 12 may be obtained according to the above sorting. If N central wavelengths are divided into three groups, then central wavelength 1, central wavelength 2 and central wavelength 3 may be divided into a group, central wavelength 4, central wavelength 5, central wavelength 6 and central wavelength 7 may be divided into a group, and central wavelength 8, central wavelength 9, central wavelength 10, central wavelength 11 and central wavelength 12 may be divided into a group. Because the central wavelength 1 to the central wavelength 3 are arranged in an ascending order or a descending order, taking the first group of central wavelengths as an example, the wavelength range formed by the first group of central wavelengths is from the central wavelength 1 to the central wavelength 3, so as to achieve that the wavelength ranges formed by the groups of central wavelengths do not overlap.

In some optional embodiments, N filtering units may be divided into multiple groups based on the wavelength range, or divided based on the dispersion penalty corresponding to the central wavelength. It can be known from Table 1 that the corresponding dispersion penalties may be approximately the same in a certain wavelength range. For example, the dispersion penalties corresponding to the central wavelengths of 1267.5 nm to 1314.5 nm are all 1 dB, the dispersion penalties corresponding to the central wavelengths of 1327.5 nm and 1334.5 nm are all 3 dB, and the dispersion penalties corresponding to the central wavelengths of 1334.5 nm to 1374.5 nm are all 4.5 dB. Based on this, the 12 wavelengths of the MWDM may be divided into three groups according to the dispersion penalty or wavelength range. For example, as shown in FIG. 3 or FIG. 5, the filtering units filled in white correspond to the filtering units corresponding to four central wavelengths with the dispersion penalty of 4.5 dB, the filtering units filled in light gray correspond to the filtering units corresponding to two central wavelengths with the dispersion penalty of 3 dB, and the filtering units filled in dark gray correspond to the filtering units corresponding to six central wavelengths with the dispersion penalty of 1 dB. Of course, in the embodiments, the grouping method of N filtering units is not limited to the above example, and other grouping methods may also be within the scope of protection of the embodiments. If the transmission losses corresponding to different central wavelengths in the N central wavelengths are different, it is necessary to group according to the dispersion penalty combined with the transmission loss.

In the embodiments, the multiple filtering unit groups may be cascaded in series or in a series-parallel combination. In practical applications, the wavelength division multiplexer pairwise channel insertion loss may be determined based on the requirement of the total power budget of each channel, and may further be determined based on the requirement of the total power budget of each channel, the dispersion penalty corresponding to the central wavelength of each channel (and possibly the transmission loss corresponding to the central wavelength of each channel); further, the cascade mode and/or cascade position may be determined based on the wavelength division multiplexer pairwise channel insertion loss. In other words, the cascade mode and/or cascade position corresponding to each filtering unit in the first wavelength division multiplexer and the second wavelength division multiplexer is determined based on the central wavelength corresponding to the filtering unit. The cascade mode is in a series connection or in a series-parallel combination connection. The cascade position indicates the position where the cascade connection is deployed, and the cascade position is associated with the cascade number, which may also be understood as that the cascade position is associated with the wavelength division multiplexer pairwise channel insertion loss.

Exemplarily, taking the design method shown in FIG. 3 as an example, referring to the wavelength division multiplexer on the left, an optical signal with the central wavelength of 1374.5 nm may be transmitted by the filtering unit with the central wavelength of 1374.5 nm and then directly reach the line side interface; an optical signal with the central wavelength of 1267.5 nm needs to be transmitted by the filtering unit with the central wavelength of 1267.5 nm and reflected by 11 filtering units, and then may reach the line side interface. Thus, for the different cascade positions, the corresponding pairwise channel insertion losses of the wavelength division multiplexer are also different, the larger the cascade number corresponding to the cascade position is, the larger the corresponding pairwise channel insertion loss of the wavelength division multiplexer is.

In some optional embodiments of the present disclosure, the cascade positions of the first filtering unit group in the first wavelength division multiplexer and the second wavelength division multiplexer are the same. The first filtering unit group is any of the multiple filtering unit groups.

In the embodiments, as shown in FIG. 3 or FIG. 5, and combined with Table 1, the dispersion penalties in the wavelength range corresponding to a group of central wavelengths are approximately the same, and the dispersion penalties in the wavelength range corresponding to different groups of central wavelengths are significantly different. Based on this, for the first wavelength division multiplexer and the second wavelength division multiplexer, a group of filtering units belonging to the same wavelength range (i.e., the first filtering unit group) are at the same cascade position in the first wavelength division multiplexer and the second wavelength division multiplexer. In this way, the total power budget of the channels in each filtering unit group can be uniformly distributed.

After the cascade position of each filtering unit group is determined, a cascade position of each filtering unit in the group can be determined based on the actual demand or preset rule.

Optionally, filtering units in the first filtering unit group in the first wavelength division multiplexer are connected in series in a first order, and filtering units in the first filtering unit group in the second wavelength division multiplexer are connected in series in a second order. The second order is a reverse order of the first order.

Referring to the example shown in FIG. 3, in the embodiments, for filtering units in each filtering unit group, the first group of filtering units in the first wavelength division multiplexer may be arranged in a descending order of wavelengths, and the first group of filtering units at the same cascade position in the second wavelength division multiplexer may be arranged in an ascending order of wavelengths.

In some optional embodiments of the present disclosure, in a case where the multiple filtering unit groups are connected in series, when a specified central wavelength corresponding to a filtering unit group in the first wave division multiplexer and the second wave division multiplexer is larger, the cascade position of the filtering unit group is closer to the line side interface.

In the embodiments, the central wavelength in each filtering unit group or the wavelength range corresponding to each filtering unit group is taken as a basis. The larger the central wavelength, the corresponding dispersion penalty is relatively large, so the pairwise channel insertion loss of the wavelength division multiplexer corresponding to the central wavelength needs to be small to meet the relatively uniform total power budget. Based on this, if the specified central wavelength corresponding to a filtering unit group (the specified central wavelength may be the maximum or minimum central wavelength in central wavelengths of this filtering unit group) is larger, the cascade position of the corresponding filtering unit group is closer to the line side interface, thereby reducing the number of reflections of the optical signal, that is, reducing the pairwise channel insertion loss of the wavelength division multiplexer.

In some optional embodiments, if a filtering unit in the second filtering unit group of the multiple filtering unit groups corresponds to the maximum central wavelength in the N central wavelengths, the filtering unit, which corresponds to the maximum central wavelength, in the second filtering unit group in the first wavelength division multiplexer is connected with the line side interface of the first wavelength division multiplexer; and the filtering unit, which corresponds to the minimum central wavelength in the wavelength range corresponding to the second filtering unit group, in the second filtering unit group in the second wavelength division multiplexer is connected with the line side interface of the second wavelength division multiplexer.

In the embodiments, if the maximum central wavelength in the N central wavelengths is determined, for example, the maximum central wavelength in FIG. 3 is 1374.5 nm, the second filtering unit group corresponding to the maximum central wavelength is determined. The cascade position of the second filtering unit group in the first wavelength division multiplexer and the second wavelength division multiplexer may be closest to the line side interface of each wavelength division multiplexer, as shown in FIG. 3. Taking that the wavelength division multiplexer on the left of FIG. 3 is the first wavelength division multiplexer as an example, the filtering unit with the maximum central wavelength in the first wavelength division multiplexer is connected with the line side interface of the first wavelength division multiplexer, while the filtering unit with the minimum central wavelength (for example, 1347.5 nm) in the wavelength range corresponding to the second filtering unit group in the second wavelength division multiplexer is connected with the line side interface of the second wavelength division multiplexer.

Figure 4:
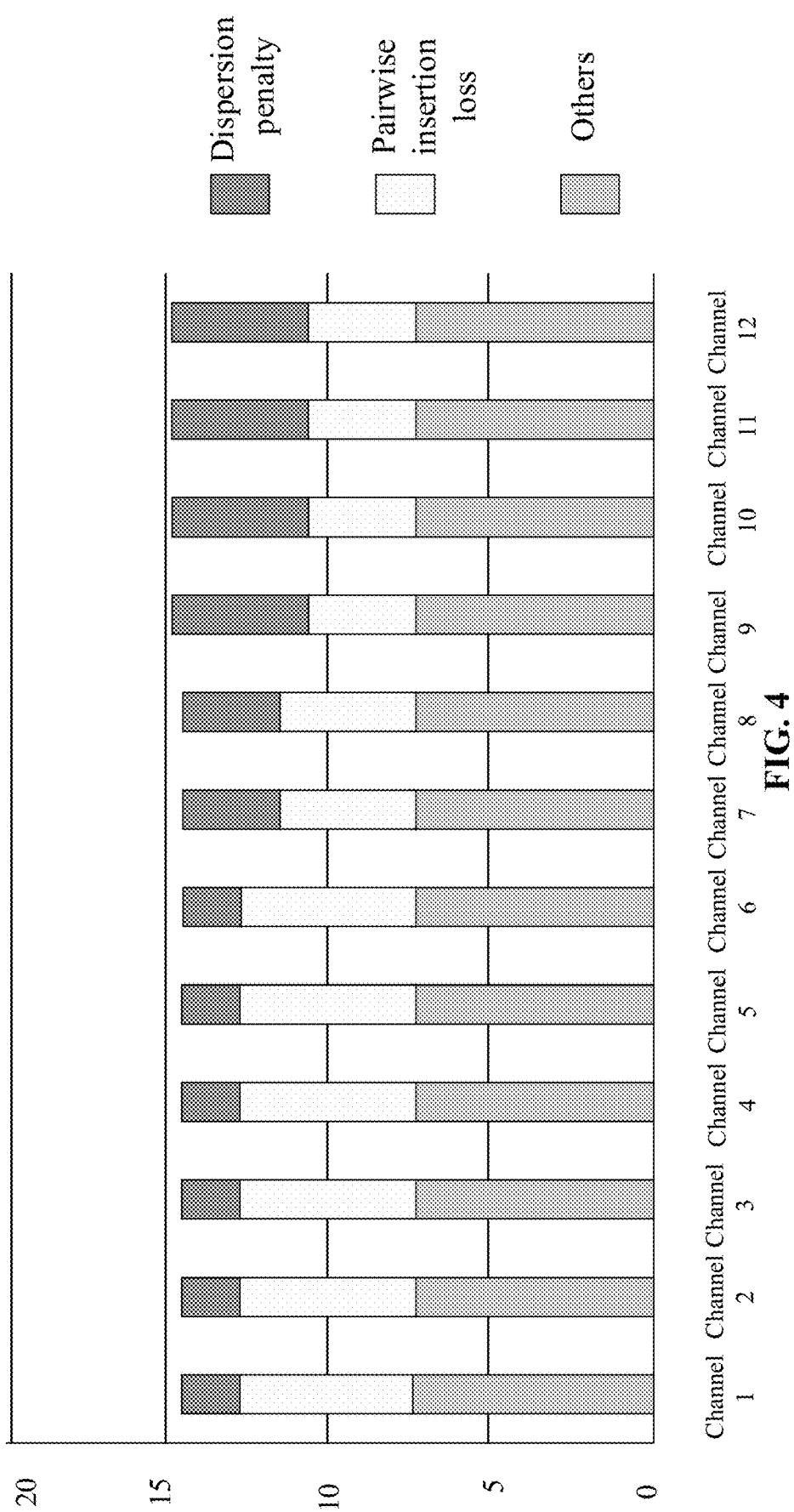
FIG. 4 is a schematic diagram of a total power budget of a WDM structure in an embodiment of the present disclosure.

FIG. 4 is a schematic diagram of a total power budget of a WDM structure in an embodiment of the present disclosure. As shown in FIG. 4, based on the design method shown in FIG. 3, the total power budget of each channel (each channel corresponds to one central wavelength in FIG. 3) can be relatively uniform. In FIG. 4, channels 1 to 6 correspond to the channels corresponding to the filtering units filled in dark gray in FIG. 3, channels 7 and 8 correspond to the channels corresponding to the filtering units filled in light gray in FIG. 3, and channels 9 to 12 correspond to the channels corresponding to the filtering units filled in white in FIG. 3.

Table 2 shows data (the third column of data) of the pairwise channel insertion loss of the wavelength division multiplexer using the design method in FIG. 3 added based on Table 1. It can be derived by adding the data from the third column to the last column in Table 2 that the total power budget for each wavelength includes 15 dB and 14.6 dB, which are less than or equal to 15 dB. When the first power threshold is 15 dB, such a design method can meet the requirement of the low-cost DML+PIN chip.

TABLE 2

| Central wavelength | Pairwise channel insertion loss (uniform distribution) | Pairwise channel insertion loss (non-uniform distribution) | Dispersion penalty | Transmission loss | Joint loss | Maintenance redundancy requirement |
|---|---|---|---|---|---|---|
| 1374.5 | 5 | 3 | 4.5 | 3.5 | 2 | 2 |
| 1367.5 | 5 | 3 | 4.5 | 3.5 | 2 | 2 |
| 1354.5 | 5 | 3 | 4.5 | 3.5 | 2 | 2 |
| 1347.5 | 5 | 3 | 4.5 | 3.5 | 2 | 2 |
| 1334.5 | 5 | 4.5 | 3 | 3.5 | 2 | 2 |
| 1327.5 | 5 | 4.5 | 3 | 3.5 | 2 | 2 |
| 1314.5 | 5 | 6.1 | 1 | 3.5 | 2 | 2 |
| 1307.5 | 5 | 6.1 | 1 | 3.5 | 2 | 2 |
| 1294.5 | 5 | 6.1 | 1 | 3.5 | 2 | 2 |
| 1287.5 | 5 | 6.1 | 1 | 3.5 | 2 | 2 |
| 1274.5 | 5 | 6.1 | 1 | 3.5 | 2 | 2 |
| 1267.5 | 5 | 6.1 | 1 | 3.5 | 2 | 2 |

Of course, embodiments of the present disclosure are not limited to the MWDM application scenario, but are also be applied to CWDM, LAN-WDM, DWDM and other wave division systems according to the scenario requirements such as the number of channels.

In some optional embodiments of the present disclosure, when the multiple filtering unit groups are connected in the series-parallel combination, the first wavelength division multiplexer and the second wavelength division multiplexer each also includes an optical splitter unit. The first interface of the optical splitter unit is connected with at least one filtering unit group, and filtering units in the at least one filtering unit group are connected in series. The second interface and the third interface of the optical splitter unit are respectively connected with two filtering unit groups connected in parallel.

Referring to FIG. 5, in the embodiments, an optical splitter unit is included. The optical splitter unit has a function of reflecting optical signals corresponding to the group of filtering units in light gray and transmitting optical signals corresponding to the group of filtering units in dark gray, so as to achieve parallel connection between the group of filtering units in light gray and the group of filtering units in dark gray; and in combination with the connection of the group of filtering units filled in white with the first interface of the optical splitter unit, the cascade connection in the series-parallel combination of the filtering units is realized.

In the embodiments, since the optical splitter unit has a certain loss in transmission of the optical signals, and the loss of transmission is greater than that of reflection, the cascade position corresponding to each filtering units in the first wavelength division multiplexer and the second wavelength division multiplexer is related to the central wavelength corresponding to the filtering unit and the power loss of the optical splitter unit.

Based on this, the optical splitter unit may be set at the corresponding cascade position based on the total power budget of each channel and in combination with the central wavelength of the channel, and the cascade positions of the filtering units corresponding to different central wavelengths are arranged flexibly according to the total power budget requirements of different scenarios, so as to enable the total power budgets of the channels to be uniform. The filtering unit with the larger dispersion penalty corresponding to the central wavelength may follow the "FIFO" principle to reduce the pairwise channel insertion loss of the corresponding wavelength division multiplexer.

With the technical solutions of the embodiments of the present disclosure, the total power budget of the channel corresponding to each central wavelength is taken into account to determine the cascade mode and/or cascade position corresponding to each filtering unit in the first wavelength division multiplexer and the second wavelength division multiplexer, the total power budgets of the channels are uniform, thereby enabling the total power budgets of the channels to meet the requirement of one type of chip and avoiding the inconvenience of production process and maintenance management caused by using two types of chip; further, the total power budgets of the channels for the 12-wavelength MWDM meet the requirement of the low-cost DML+PIN chip, thereby greatly reducing the cost.

The characteristics disclosed in some product embodiments provided in the present disclosure may be freely combined without conflicts to obtain new product embodiments.

The above is only the specific implementation modes of the disclosure and not intended to limit the protection scope of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A Wavelength Division Multiplexing (WDM) structure, comprising: a first wavelength division multiplexer and a second wavelength division multiplexer;
   wherein each of the first wavelength division multiplexer and the second wavelength division multiplexer comprises N filtering units, a branch side interface connected to each of the filtering units, and a line side interface, N being a positive integer, each of the filtering units corresponds to one central wavelength, the line side interface of the first wavelength division multiplexer and the line side interface of the second wavelength division multiplexer are connected by an optical fiber;
   the N filtering units are divided into multiple filtering unit groups based on a central wavelength corresponding to each of the filtering units, and the multiple filtering unit groups are cascaded in series, or, the multiple filtering unit groups are cascaded in a series-parallel combination, and filtering units in each filtering unit group are cascaded in series; and
   wherein a cascade mode and/or cascade position corresponding to each of the filtering units in the first wavelength division multiplexer and the second wavelength division multiplexer is at least related to a central wavelength corresponding to the filtering unit, so that a total power budget of a channel corresponding to each central wavelength is less than or equal to a first power threshold, and a difference between total power budgets of respective channels corresponding to different central wavelengths is less than a second power threshold;
   wherein pairwise channel insertion losses corresponding to different groups of central wavelengths in the first wavelength division multiplexer and the second wavelength division multiplexer are in non-uniform distribution; pairwise channel insertion losses corresponding to a same group of central wavelengths in the first wavelength division multiplexer and the second wavelength division multiplexer are in relatively uniform distribution.

2. The WDM structure of claim 1, wherein each filtering unit group in the first wavelength division multiplexer and the second wavelength division multiplexer corresponds to one group of central wavelengths, and wavelength ranges formed by different groups of central wavelengths do not overlap.

3. The WDM structure of claim 1, wherein cascade positions of a first filtering unit group in the first wavelength division multiplexer and the second wavelength division multiplexer are the same, and the first filtering unit group is any of the multiple filtering unit groups.

4. The WDM structure of claim 3, wherein filtering units of the first filtering unit group in the first wavelength division multiplexer are connected in series in a first order, and filtering units of the first filtering unit group in the second wavelength division multiplexer are connected in series in a second order, the second order being a reverse order of the first order.

5. The WDM structure of claim 1, wherein in a case where the multiple filtering unit groups are cascaded in series, when a specified central wavelength corresponding to a filtering unit group in the first wave division multiplexer and the second wave division multiplexer is larger, a cascade position of the filtering unit group is closer to the line side interface.

6. The WDM structure of claim 5, wherein if a filtering unit in a second filtering unit group of the multiple filtering unit groups corresponds to a maximum central wavelength of N central wavelengths,
   in the second filtering unit group in the first wavelength division multiplexer, the filtering unit corresponding to the maximum central wavelength is connected with the line side interface of the first wavelength division multiplexer; and
   in the second filtering unit group in the second wavelength division multiplexer, a filtering unit corresponding to a minimum central wavelength in a wavelength range corresponding to the second filtering unit group is connected with the line side interface of the second wavelength division multiplexer.

7. The WDM structure of claim 1, wherein in a case where the multiple filtering unit groups are cascaded in the series-parallel combination, the first wavelength division multiplexer and the second wavelength division multiplexer each comprises an optical splitter unit, and wherein
   a first interface of the optical splitter unit is connected with at least one filtering unit group, and filtering units in the at least one filtering unit group are connected in series;
   a second interface and a third interface of the optical splitter unit are respectively connected with two filtering unit groups connected in parallel.

8. The WDM structure of claim 7, wherein a cascade position corresponding to each filtering unit in the first wavelength division multiplexer and the second wavelength division multiplexer is related to a central wavelength corresponding to the filtering unit and a power loss of the optical splitter unit.

9. The WDM structure of claim 1, wherein the total power budget comprises a wavelength division multiplexer pairwise channel insertion loss, a dispersion penalty, a transmission loss, a joint loss and maintenance redundancy, and wherein the wavelength division multiplexer pairwise channel insertion loss is related to a cascade position of each filtering unit in the first wavelength division multiplexer and the second wavelength division multiplexer, the dispersion penalty and the transmission loss are related to a central wavelength of the filtering unit.

\* \* \* \* \*